Figure 1:
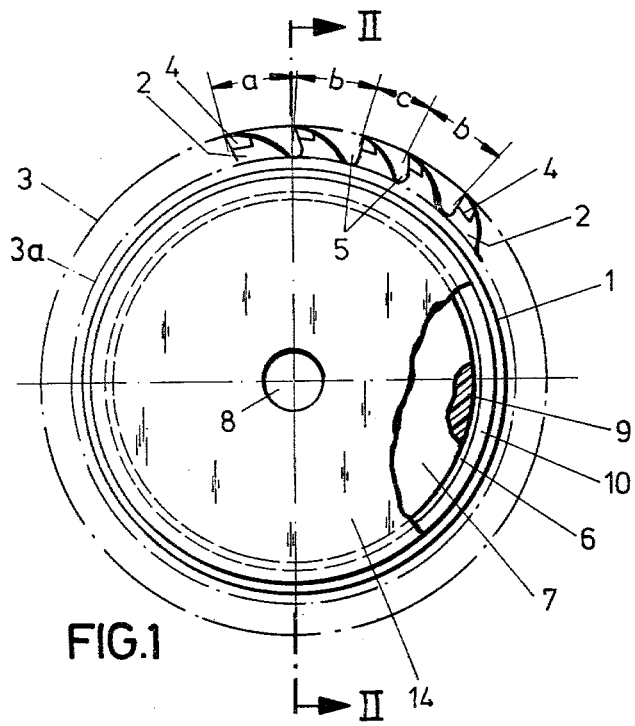

United States Patent [19]

Saljé et al.

[11] 4,201,103

[45] May 6, 1980

[54] CIRCULAR SAW TOOL

[75] Inventors: Ernst Saljé, Bendestorf; Ulrich Bartsch, Brunswick, both of Fed. Rep. of Germany

[73] Assignee: Ernst Saljé, Bendestorf, Fed. Rep. of Germany

[21] Appl. No.: 950,282

[22] Filed: Oct. 11, 1978

[30] Foreign Application Priority Data

Oct. 14, 1977 [DE] Fed. Rep. of Germany ....... 2746192

[51] Int. Cl.² .............................................. B27B 33/08
[52] U.S. Cl. ......................................... 83/835; 76/112
[58] Field of Search ................................... 83/835–855; 76/112

[56] References Cited

U.S. PATENT DOCUMENTS

| 3,799,025 | 3/1974 | Tsunoda | 83/835 |
| 4,106,382 | 8/1978 | Salje et al. | 83/835 |

Primary Examiner—J. M. Meister
Attorney, Agent, or Firm—Holman & Stern

[57] ABSTRACT

A blade with teeth whose spacing varies around the periphery has, on at least one side, a cover element and an intermediate visco-elastic layer, in order to reduce noise. A holding element fixed to a support ring holds the cover element on the blade independently of the intermediate layer and allows the layer to perform a damping function subject to thrusting stresses.

28 Claims, 5 Drawing Figures

CIRCULAR SAW TOOL

The invention relates to a circular saw tool, with a single or multi-layer main blade which carries the teeth and which is provided on at least one side, but preferably on both sides, with a cover element arranged on an intermediate layer, this cover layer being in particular of continuously planar circularly annular shape.

An urgent but difficult problem is the reduction of noise occurring while the saw blades are rotating, both when the saw blades are idly rotating and particularly when they are performing sawing work. This is true of tools for processing wood and plastics material but also of tools for processing metal, for example saws for sawing light metals. It has been found that an appreciable reduction of noise is possible with a circular saw tool constructed in the above-described way (which does not belong to the prior art), this reduction in noise being caused by damping the noise-generating vibrations of the saw blade, and by sound-absorption.

The intermediate layer (in particular an adhesive layer) not only serves to support the cover element on the main blade but also carries out an important function in damping vibrations. The vibration, from outside or self-excited, of the rotating tool causes thrusting movement between the cover element and the main blade, as a result of which corresponding thrusting stresses are produced in the intermediate layer and a damping effect is brought about.

While the tool is being used, vibration energy is introduced by the saw teeth into the main blade. However, if the main blade is "encapsulated" by lateral intermediate layers and by cover elements, so that a dissipation of sound through the air can only be carried out by the cover elements, the body sound vibrations must pass through the damping areas formed by the intermediate layers in order to reach the cover elements. As the intermediate layers have, in comparison with the main blade and with the cover elements, a relatively low modulus of elasticity, effective body sound damping takes place.

It is important, for the use of tools provided with cover elements, that the cover elements shall maintain their position on the main blade and not become separated whilst stresses are being applied. On the other hand, the most thorough damping effect possible is to be achieved. Thus, we have here requirements which run contrary to one another in a large measure.

Underlying the invention is the object of favourably modifying a circular saw tool of the type defined at the outset. In order to realise this object the main blade and its cladding have to be securely held together. In particular, we have to enable the requirements for achieving a good damping effect in different circumstances to be satisfied, and at the same time exclude any danger of the main blade and cover elements becoming separated from each other. Further problems which are associated with this and which this invention is concerned, will become clear from the solution set out in the following explanation.

The invention makes provision—in the case of a circular saw tool, with an intermediate (e.g. adhesive) layer on one side (preferably on both sides), and with a cover element arranged on this intermediate layer—of a mechanical holding means for the cover element, this holding means lying at least in the vicinity of the outer periphery of the cover element, being independent of the intermediate layer, and allowing the intermediate layer to perform a damping action subject to thrusting stresses.

Due to the mechanical holding means, whose details of construction may vary, in a tool of this kind, the position of the cover element on the main blade is specially secured, viz. by the holding means, so that the cover element cannot become separated even when relatively large stresses are applied. Also, as thrusting movements can occur between the parts which are interconnected by way of the intermediate layer, the thrusting stresses which determine the damping effect can occur in the intermediate layer. An important advantage resides in the fact that, in the choice of material for the intermediate layer, e.g. visco-elastic material, emphasis does not have to be placed on the sticking or securing function. Indeed primary attention can be given to the criteria which, in each individual case of need, are important for the damping effect, both in respect of the kind and adjustment of the material, more specifically with reference to the modulus of elasticity or the modulus of shear and also relative to the geometric conditions, e.g. the thickness of the layer.

In a favourable embodiment of the invention there is provided a holding element which at least partially covers the cover element and which by the outer edge region of this holding element, is fixed to a firm support, which is separate from the cover element. Conveniently, the holding element is shaped as a circular ring or disc.

The firm support for the holding element may be constituted by the main blade or by a ring connected to the main blade. In the latter case the thickness of the ring preferably substantially corresponds to the combined thickness of the intermediate layer and of the cover element. The ring may consist of steel or of a non-ferrous metal, in particular a copper alloy which has favourable damping properties. A plastics material may also be considered as material for the ring.

The ring may be attached by rivetting or its material may be bonded to the material of the main blade. The latter alternative means that connections are established by melting or softening the material of the parts themselves which are to be attached to one another, or by the melting or softening of an additive substance. These materials are solidified after the abovementioned melting or softening stage. For bonding the materials together welding may be employed, that is to say pressure welding (e.g. spot welding) and fusion welding. Particularly favourable in respect of the thermal conditions are electron beam welding and laser beam welding. It may be advantageous to simultaneously establish a connection between a holding element for the cover element and a ring, which forms a support for the holding element, and between this holding element and this ring (on the one hand) and the main blade (on the other hand).

The holding element may in particular be in the form of a relatively thin foil. The thickness of this foil may for example be of the order of magnitude of hundredths of a millimeter.

In addition to steel, a non-ferrous metal or a plastics material may be considered as the material to be used for the holding element. The statements made above, in connection with attaching a ring to the main blade, are applicable for attaching the holding element to its support. It is particularly favourable if the holding element is attached by electron beam welding or laser beam welding.

A slide layer may be provided between the cover element and the holding element. This slide layer may be in the form of a free lubricant film, or in the form of a coating of the outside of the cover element and/or of the inside of the holding element with a friction-reducing material.

A further embodiment of the tool is characterised in that the cover element is provided, in the vicinity of its outer edge, with at least one deformation region, and is attached to the main blade in an area lying radially outwardly beyond this deformation region.

The cover element is securely held in this way and it is possible, through the provision of the deformation region, to obtain thrusting movement of the cover element and main blade relative to one another, with the occurrence of corresponding thrusting stresses in the intermediate layer. A deformation region is any suitable formation which allows for relative movement between the fixed edge of the cover element and the other part which participates in the production of thrusting stresses in the intermediate layer. The statement made above concerning the attachment of a holding element to its support is applicable to the attachment of the outside edge of the cover element to the main blade.

In conjunction with the construction, explained above, of the circular saw tool it is advantageous, irrespective of the details of construction, to arrange for the spacing between the teeth of the main blade, that is to say the tooth spacing, to be differential or irregular. In this way the unfavourable effects of a constant engagement frequency, which are experienced in the case of a constant tooth spacing, are precluded, so that the noise spectrum obtained will not, for this reason, have high individual amplitudes or peaks at specific frequencies.

The invention is particularly applicable to saws for treating wood and plastics materials. However, the invention can also be advantageously used with metal-saw blades.

Figure 2:
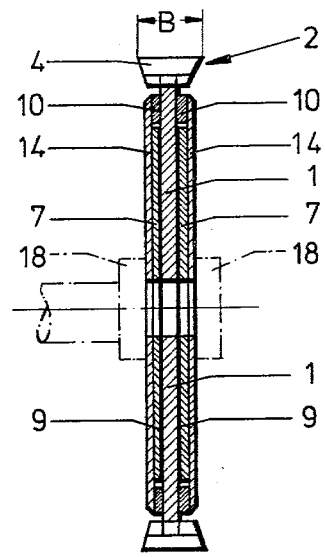
Figure 3:
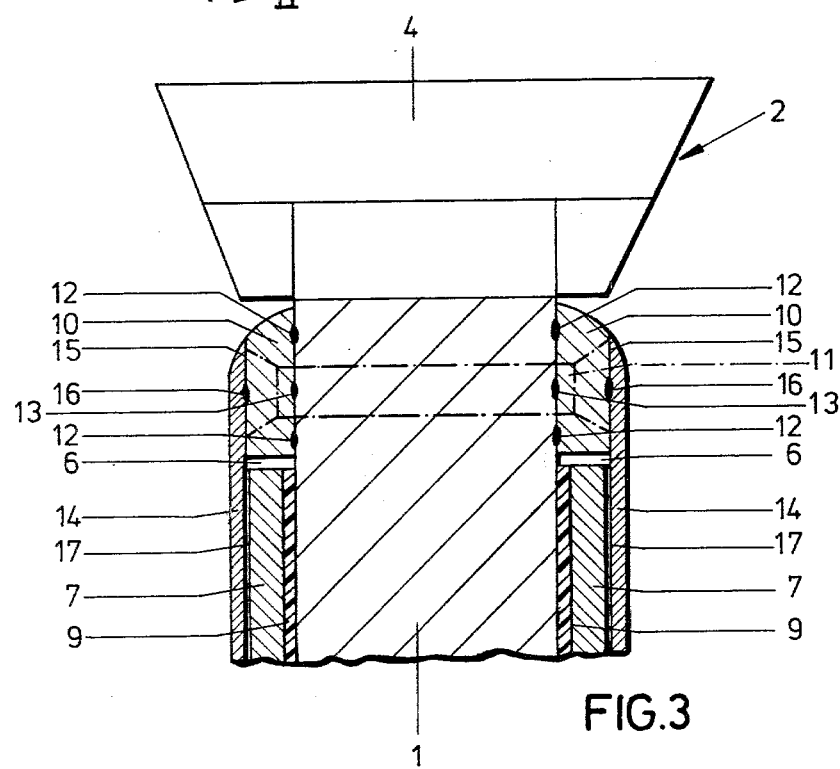
Figure 4:
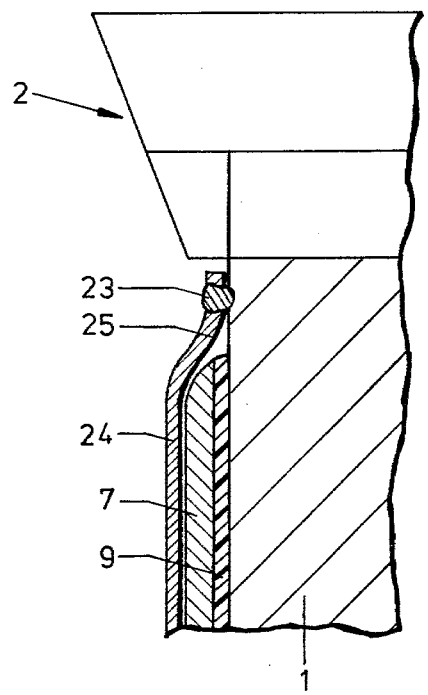
Figure 5:
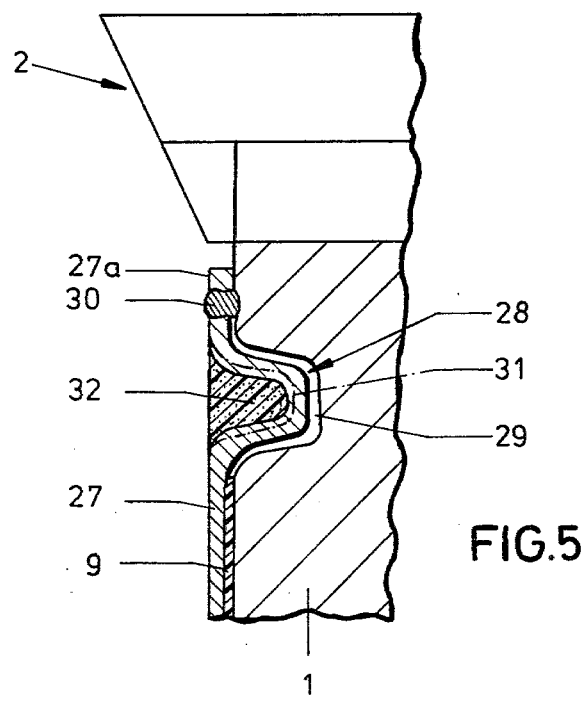

The invention will be described further, by way of example only, with reference to the accompanying drawings, in which:

FIG. 1 is a side elevation of a circular saw tool;
FIG. 2 is a section on line II—II of FIG. 1;
FIG. 3 is a detail of FIG. 2 on an enlarged scale;
FIG. 4 is a cross-section, similar to that of FIG. 3, of another embodiment of the tool; and
FIG. 5 is similar to FIG. 4 and illustrates a further embodiment of the tool.

The circular saw tool shown in FIGS. 1 to 3 has a disc-shaped main blade 1 which consists of steel and whose periphery is provided with teeth 2. (The main blade 1 may be modified so as to consist of a number of layers or parts.) FIG. 1 only shows some of the teeth, which are distributed around the entire periphery of the blade; the contact circle of the teeth points is indicated by a chain-dotted line 3. The teeth 2 may be provided with hard metal cutting plates 4, attached by soldering, or may be provided with ceramic cutting plates 4, or may be constituted in other ways. Also, the teeth 2 may consist of the same material as the main blade 1 itself. Reference symbol 5 designates the bottom of each of the gaps between adjacent teeth. The tooth spacing, that is to say the distance of the cutting edges of the teeth from one another is not constant over the periphery of the blade, but varies over the periphery. This in indicated in FIG. 1 by the different distances a, b, and c; the distance a for example is 5 or 10% greater than the distance b, and the distance c for example is 5% smaller than the distance b. This sequence may be repeated, or the distance between other teeth may be different from this. This form of construction avoids a single tooth-engagement frequency, with its associated drawbacks. This is of particular advantage in connection with the embodiment of the tool which will be described below and in which the vibration amplitudes of other frequencies are reduced.

On both of its sides the main blade 1 is provided with cover elements 7 in the form of continuously planar thin discs made of steel (thickness 0.2 mm for example) which extend from the centre bore 8 of the main blade 1 almost to the bottom 5 of the gaps between adjacent saw teeth. Between the cover element 7 and the main blade 1 is an intermediate layer 9 which is constituted by a visco-elastic material, in particular by a synthetic resin adhesive. More specifically, this visco-elastic material has a high degree of elasticity, while it does not have too great a hardness; its thickness may for example be 0.05 mm or more. Not only does this layer 9 interconnect, in each instance, a cover element 7 to the main blade 1, but it also has the important function of damping vibration, and hence sound. When vibration is set up in the main blade, whether the blade is rotating idly or when it is in operation, thrusting forces are set up between the cover element 7 and the main blade 1, these thrusting movements causing thrusting stresses to be applied to the layers 9, so that these layers 9 are subjected to damping thrusting stresses.

A ring 10 is fixed to the main blade 1 (one on each side) in the area between the outside edge 6 of one of the cover elements 7 (with the adhesive layer 9) and a line 3a which follows the bottom 5 of the gap between adjacent teeth and is indicated in chain-dotted line in FIG. 1. This ring 10 may consist of steel or of other material, in particular a material which itself has damping properties. The rings 10 may be attached to the main blade 1 by, for example, rivets 11 (shown in chain-dotted line in FIG. 3) or by welding. Weld points are schematically indicated in FIG. 3 by reference symbols 12 and 13. Thus, welding may be in the form of adjacent spot welds or by welding in the form of seams running in the circumferential direction. In particular, this welding is carried out by beam welding.

Holding means for the cover elements 7 are independent of the adhesive layers 9 and, in the embodiment illustrated, are in the form of holding elements constituted by foils 14 of steel or of a material with a lower modulus of elasticity. The thickness of the foils 14 is for example 0.05 mm or more. The foils 14 lie over the cover elements 7 and extend radially outwardly beyond the cover elements 7 as far as the rings 10, whose faces 15 thus form a secure support for the foils 14. In the embodiment illustrated these foils 14 are attached to the rings 10 by a weld seam 16 which is schematically shown in FIG. 3, extends continuously in the circumferential direction, and is produced by means of an electron or laser beam. A single welding process may possibly attach the ring 10 to the main blade 1 (weld point 13) and also attach the holding element, constituted by the foil 14, to the ring 10 (weld point 16). The thickness of the composite assembly, made up by the main blade with the cladding provided on both sides of the main blade, is less than the greatest width B of the teeth (FIG. 2) or than the cutting width.

The continuously smooth outer holding foils 14 secure the cover elements 7 in place and prevent them from becoming separated from the main blade 1; this is accomplished without adversely affecting the operation of the tool in any way. At the same time the further advantage is afforded that the material of the layers 9 can be specially selected from the standpoint of the required damping action, and the fixing or securing function of these layers 9 is not of primary importance; indeed, under certain circumstances these layers 9 do not perform any fixing or securing function at all. The intermediate layer 9 is therefore better described as a damping layer than as an adhesive layer. This is true irrespective of the mode of construction of the tool in detail.

A slide layer 17 (FIG. 3) may be provided between the holding element 14 and the cover element 7. This slide layer 17 may for example be a thin film of lubricant applied during assembly of the tool. More specifically, this lubricant may contain or consist of molybdenum disulphide, or the slide layer 17 may be constituted as a coating on the inside of the holding body 14 and/or on the outside of the cover element 7; these coatings may for example be of PTFE.

In FIG. 2 chain-dotted lines 18 indicate the usual flanges used for clamping the circular saw tool in position. Both the cover element 7 and the holding element 14 are enclosed between these flange parts 18, and are thereby secured in place. In addition, the holding elements 14 may also be attached to the main blade 1 at their inner edges; this attachment may be effected continuously or only at individual points, for example by welding.

According to the particular circumstances obtaining, and depending on the required cutting depth for the tool, the tool may be so constructed that the holding elements 14 only screen the associated cover elements parially, for example in an outside area on the periphery.

In the embodiment of the tool shown in FIG. 4 an adhesive or damping layer 9 is again provided on the main blade 1, together with a cover element 7 abutting it. This embodiment also comprises a holding element 24, which holds the cover element 4 in place and is in the form of a foil-like metal disc. The secure supporting surface 25, for supporting the outer edge area of the holding element 24, is formed by the main blade 1 itself in this embodiment. The holding element 24 is juxtaposed to the main blade 1 by its portion which projects outwardly beyond the cover element 7 and the layer 9 and is in the form of a protuberance, and is attached to the main blade 1 by means of a weld seam 23 which extends round the periphery.

FIG. 5 illustrates an embodiment of the circular saw tool with a main blade 1, with an adhesive or damping layer 9, and with a cover element 27. This embodiment of the tool does not comprise a separate holding element; the cover element is mechanically held in place by holding means constituted by the cover element itself. The cover element 27, which for example consists of a thin sheet steel part, comprises, in its outer region, a deformation region 28 in the form of a profiled part of substantially U-shaped cross-section, which extends round the whole periphery and projects transversely into a small recess 29 of the main blade 1. At its edge portion 27a, extending radially outwardly beyond the U-shaped portion, the cover element 27 is attached, and thus firmly secured, to the main blade 1 by means of a weld seam 30 passing round the periphery. The deformation region 28 acts somewhat in the manner of an expansion bend or elbow in a pipe, or analogously to the profiled part of a barometer diaphragm, so that, in the whole part of the cover element lying within the annular deformation region 28, and when vibrations are set up, a thrusting movement can take place relative to the main blade 1 and, accordingly, the thrusting stress may be applied to the damping layer 9. As is indicated by a chain-dotted line 31, the cover element 27 may also be of reduced wall thickness in the deformation region 28. The hollow of the deformation region 28 may possibly be filled with a soft material 32, e.g. a foam material, so that in this way a smooth outside surface is obtained.

We claim:

1. A circular saw comprising a main blade provided with teeth, and on at least one side of the main blade a cover element, an intermediate layer between the cover element and the main blade, and mechanical holding means, at least adjacent the periphery of the cover element holding the cover element on the main blade independently of the intermediate layer and allowing the intermediate layer to perform a damping function subject to thrusting stresses.

2. A tool as claimed in claim 1, in which the holding means comprises a holding element which at least partially covers the cover element, and a support which is separate from the cover element, the holding element having its periphery fixed to the support.

3. A tool as claimed in claim 2, in which the periphery of the holding element is of circular shape.

4. A tool as claimed in claim 2, in which the support for the holding element is constituted by the main blade itself.

5. A tool as claimed in claim 2, in which the support for the holding element comprises a ring attached to the main blade.

6. A tool as claimed in claim 5, in which the axial thickness of the ring substantially equals the combined thickness of the intermediate layer and the cover element.

7. A tool as claimed in claim 5, in which the ring consists of steel.

8. A tool as claimed in claim 5, in which the ring consists of a non-ferrous metal.

9. A tool as claimed in claim 8, in which the ring consists of a copper alloy.

10. A tool as claimed in claim 5, in which the ring consists of plastics material.

11. A tool as claimed in claim 5, in which the ring and the main blade are bonded to each other by their own materials.

12. A tool as claimed in claim 5, in which the ring is attached to the main blade by rivetting.

13. A tool as claimed in claim 5, in which the ring is attached to the holding element and to the main blade by a simultaneously-established connection.

14. A tool as claimed in claim 2, in which the holding element is a foil.

15. A tool as claimed in claim 14, in which the thickness of the foil is a few hundredths of a millimeter.

16. A tool as claimed in claim 2, in which the holding element consists of steel.

17. A tool as claimed in claim 2, in which the holding element consists of a non-ferrous metal.

18. A tool as claimed in claim 2, in which the holding element consists of plastics material.

19. A tool as claimed in claim 2, in which the holding element and the support are bonded to each other by their own materials.

20. A tool as claimed in claim 2, in which the holding element is attached to the support by rivets.

21. A tool as claimed in claim 2, including a slide layer provided between the holding element and the cover element.

22. A tool as claimed in claim 1, in which the cover element in the vicinity of its periphery, has a deformation region and is attached to the main blade by the holding means radially outside the deformation region.

23. A tool as claimed in claim 22, in which the cover element is of reduced thickness in the deformation region.

24. A tool as claimed in claim 22, in which the deformation region projects into a recess in the main blade.

25. A tool as claimed in claim 22, in which the cover element and the main blade are bonded to each other by their own materials.

26. A tool as claimed in claim 22 in which the cover element is fixed to the main blade by rivets.

27. A tool as claimed in claim 1, in which the teeth spacings vary around the periphery.

28. A tool as claimed in claim 1, in which the cover element is a continuous planar circular annulus.

* * * * *